Nov. 9, 1943.　　　G. A. TINNERMAN　　　2,334,046
CAP DEVICE
Filed Aug. 12, 1942　　　2 Sheets-Sheet 1

Inventor
GEORGE A. TINNERMAN
By Bates, Teare & McBean
ATTORNEYS.

Nov. 9, 1943.  G. A. TINNERMAN  2,334,046
CAP DEVICE
Filed Aug. 12, 1942  2 Sheets-Sheet 2
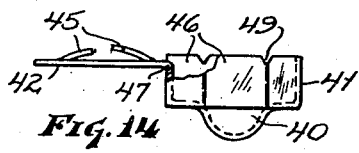
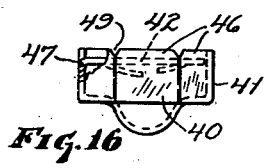
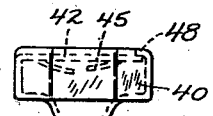
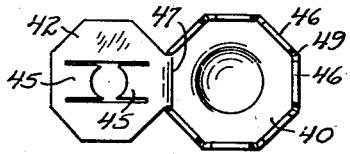
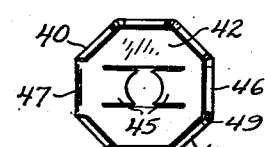
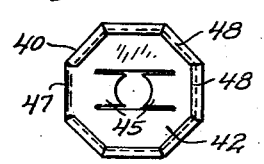
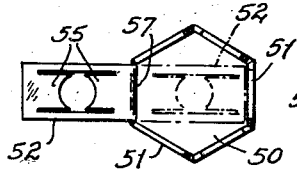 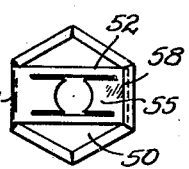 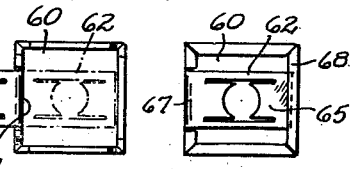
 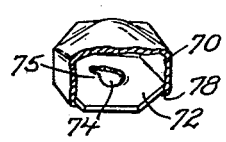 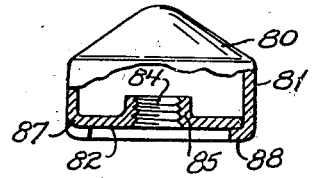
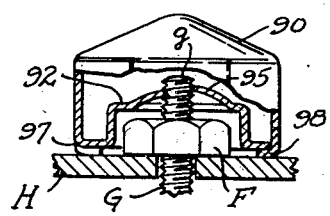 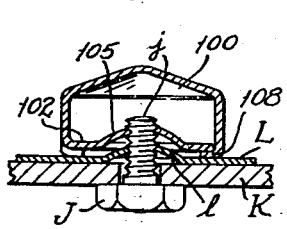 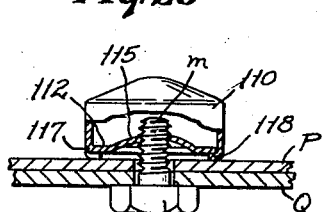
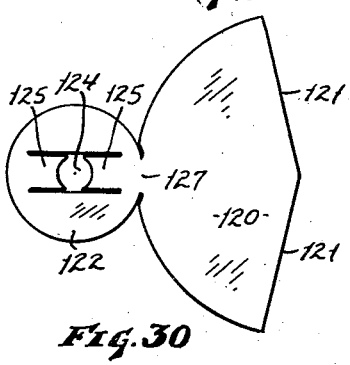 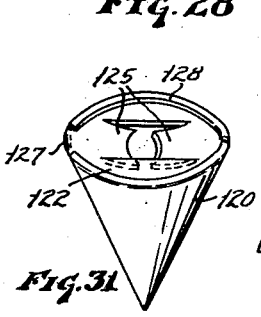
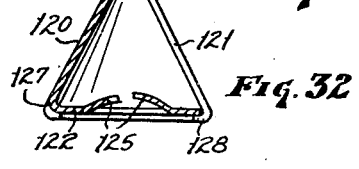
Inventor
GEORGE A. TINNERMAN
By Bates, Teare & McBean,
ATTORNEYS Patented Nov. 9, 1943

2,334,046

UNITED STATES PATENT OFFICE 2,334,046

CAP DEVICE

George A. Tinnerman, Cleveland, Ohio, assignor to Tinnerman Products, Inc., Cleveland, Ohio, a corporation of Ohio Application August 12, 1942, Serial No. 454,510

13 Claims. (Cl. 85—35)

This invention relates to hollow caps provided with means whereby they may be automatically engaged to a stud or screw. The cap itself may, for instance, constitute a closure for a receptacle having a threaded neck, or it may be a knob, finishing button, or take various other forms, but it is characterized by being formed of a single piece of sheet material.

In producing the article by my method, I take a blank of flat sheet material, preferably sheet metal, and by a stamping and pressing operation form the body of the cap with a laterally extended portion, which is distorted in suitable manner to provide it with shoulders about an opening suitable for engaging the stud or a thread, and such flattened portion is then turned crosswise of the cap at the bottom thereof to bring the opening into axial position, and thereafter the body of the cap is flanged beneath such inturned bottom portion. This method produces from a single sheet of material a hollow cap having an integral bottom member provided with integral stud-engaging means, so that the cap is ready for immediate application.

Various embodiments of my cap, made by the method outlined above, are illustrated in the drawings hereof and are hereinafter described in detail with reference to those drawings.

In the drawings, Fig. 1 is a sectional side elevation of my cap mounted on the upper portion of a container having a threaded neck; Fig. 2 is a perspective partly broken away of the cap shown in Fig. 1; Fig. 3 is a complete perspective of the cap looking at the bottom thereof; Figs. 4 to 9 inclusive illustrate various steps in the manufacture of the cap of Figs. 1, 2, and 3, Fig. 4 being a plan of the first temporary product as stamped from sheet metal, and Fig. 5 a section thereof; Fig. 6 being a plan and Fig. 7 a section of the cap after the second stage of manufacture and Fig. 8 a bottom plan and Fig. 9 a section of the article as finished in the third stage of manufacture.

Figs. 14 to 19 inclusive illustrate the invention as embodied in an octagonal cap-nut; Fig. 14 being a side elevation of a partially formed article in the first stage of manufacture and Fig. 15 a plan thereof; Figs. 16 and 17 being a side elevation and a plan of this embodiment in the second stage of manufacture, and Figs. 18 and 19 being a side elevation and plan of the complete article.

Figs. 20 to 22 illustrate the invention embodied in a hexagonal cap-nut; Fig. 20 being a bottom plan after the blank is stamped but before the bottom member is turned in; Fig. 21 being a bottom plan of the finished nut; and Fig. 22 a sectional side elevation of the finished nut.

Figs. 23 and 24 illustrate the invention embodied in a square cap-nut; Fig. 23 being a bottom plan of the stamped article before the bottom member is turned in, and Fig. 24 a bottom plan of the finished article.

Figs. 25 and 26 are sectional side elevations of my cap-nuts illustrating thread-engaging portions of the nut bottoms of forms different from that of the preceding figures; Fig. 25 showing such thread-engaging portion as a single warped edge and Fig. 26 as a drawn internally tapped portion.

Figs. 27 and 28 are sectional side elevations of my cap-nut arranged to be applied as a finishing button over an existing nut on a bolt, the existing nut of Fig. 27 being an ordinary hexagonal tapped nut and that of Fig. 28 a sheet metal nut made by cut out tongues.

Fig. 29 is a sectional elevation of my cap device illustrating its use as a nut for holding together two superimposed sheets by a conventional bolt.

Figs. 30 to 32 illustrate my cap-nut wherein the cap is of conical form; Fig. 30 being a plan of the cut blank; Fig. 31 a bottom perspective of the finished cap-nut, and Fig. 32 an axial section through the cap-nut.

Figure 1:
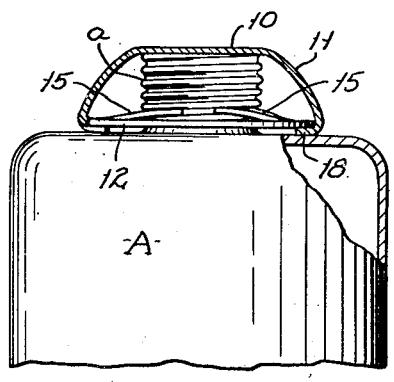
Figure 2:
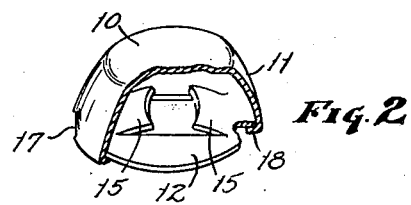
Figure 3:
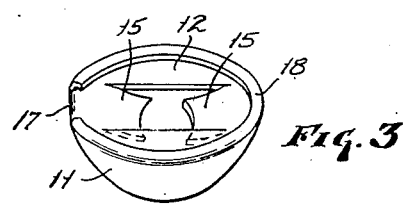

I will first describe the embodiment illustrated in Figs. 1 to 9. In Figs. 1 and 2, I have shown a cap of inverted bowl-like form having a flat top portion 10 and a depending annular wall 11, which may be a segment of a sphere, and a flat bottom 12 carrying tongues 15 to form a nut. The bottom is a circular disc integrally connected with the wall for a short distance and held in place by an inwardly flanged bottom edge 18 of the wall.

As shown, there are two parallel slits 13 in the bottom tangential to a central hole 14. This leaves the pair of tongues 15 on opposite sides of the hole. These tongues are bent up obliquely in opposite directions and slightly warped at their facing edges to bound one turn of a helix, corresponding to the screw thread with which the cap is to be used.

Figure 4:
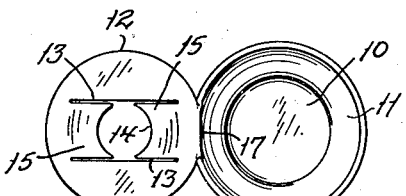
Figure 5:
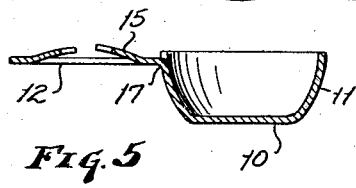

Figs. 4 and 5 illustrate the first important stage in the manufacture of the construction so far described. The partially formed body there shown may be made by one or more stamping operations. A single sheet of metal may be pressed between a pair of coacting male or female dies, preferably formed to press in the bowl-like portion 10, 11 with the bottom disc 12 integrally connected therewith but extending outwardly. By the same or another operation the hole 14 and the slits 13 for the tongues 15 may be made, and the tongues bent up into the oblique and warped position desired. Following these operations the exterior of the bowl and disc may be trimmed off. Whether one or more operations are employed, the single integral member shown in Figs. 4 and 5 is produced, and constitutes what it is convenient to call the first stage in formation.

Figure 6:
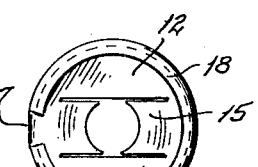
Figures 7, 9:
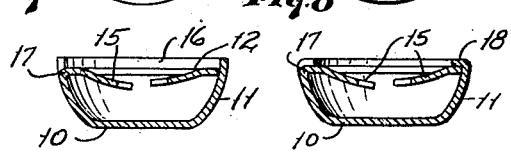

The second stage of the formation of this embodiment of the article comprises bending the disc 12 about its junction with the bowl as a hinge until it extends in the opposite direction from that shown in Figs. 4 and 5, and thus lies within the bowl as shown in Figs. 6 and 7. In this position the periphery of the disc engages the inner wall of the bowl and the bowl has an incomplete annular region 16 above the disc 12, this annulus being interrupted at the original integral junction 17 of the disc with the bowl. I call the operation just described the second stage in the manufacture of the article.

Figure 8:
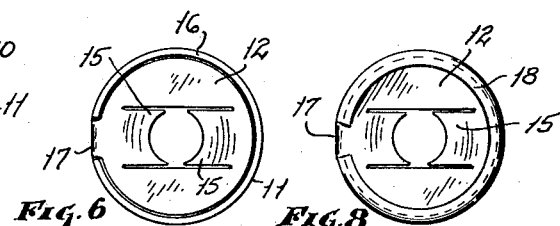

I now flange inwardly the projecting, incompletely annular, portion 16 of the bowl and thus make an incompletely annular horizontal flange 18 overlying and snugly engaging the disc 12, as shown in Figs. 8 and 9. This is the third stage in the operation of forming this embodiment and produces the complete cap shown in perspective in Figs. 2 and 3.

In Fig. 1, I have shown the complete cap just described as applied to a container A having an externally threaded neck a. The tongues 15 of the cap bottom have recessed and warped edges corresponding to the thread of the neck a. Such tongues accordingly provide a nut for such thread and the cap may be readily screwed into place on the neck. Fig. 1 shows the inturned flange 18 abutting the shoulder of the container around the neck and the flat top 10 of the cap abutting the top of the neck. It is to be understood, of course, an annular gasket may be mounted on top of the neck engaged by the portion 10 or on the container about the neck to be engaged by the flange 18.

Figure 10:
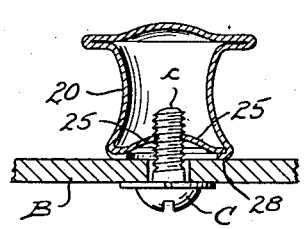
Fig. 10 is a section of my cap embodied as a knob, showing the same in place.
Figure 11:
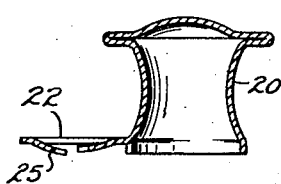
Fig. 11 is a view of such knob as formed before the bottom has been turned in and secured in place.

The second embodiment of a cap member made in my invention is illustrated in Figs. 10 and 11 as a hollow knob 20 formed first with an extending disc 22 having tongues 25 formed like the disc 12 and tongues 15 of Figs. 4 and 5.

After the formation of the knob preferably by several stamping and drawing operations to produce the partially completed article of Fig. 11, the disc 22 is then turned inwardly to provide the nut carrying bottom for the knob and then the knob is flanged inwardly beneath the disc as shown at 28. These operations of bending in the bottom disc correspond with those described with reference to Figs. 6 and 7 and the operation of flanged edge 28 corresponds to that described with reference to Figs. 8 and 9.

Fig. 10 illustrates the knob 20 mounted on a suitable panel B by means of a screw C. The screw is shown as having its head below the panel and the threaded shank c passing through an opening in the panel and receiving the nut provided by the warped oblique tongues 25.

Figure 12:
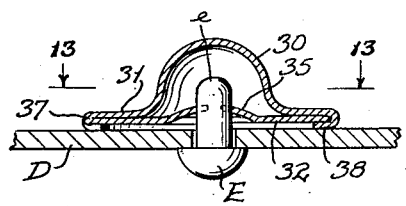
Fig. 12 is a sectional elevation of my cap embodied as a finishing button, the view showing the same held in position on a supporting panel.
Figure 13:
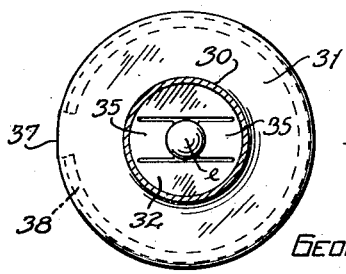
Fig. 13 is a cross section of the latter embodiment, the plane of the section being indicated by the line 13—13 on Fig. 12.

Figs. 12 and 13 illustrate my invention embodied as a finishing button. In this case I form by a suitable stamping operation or operations a dome 30 with an extended annular flange 31 and a circular bottom portion 32 which originally extends outwardly from the edge of the flange 31 by a connection region 37 similar to the construction of Fig. 5. This outwardly extending disc has an axial passageway and oblique tongues 35. This disc-like bottom is then bent inwardly and the peripheral portion of the flange 31 bent inwardly beneath the bottom disc as shown at 38.

The operations of making the finishing button are similar to those performed in making the cap and the knob already described; however, if the finishing button is not to have a screw thread but merely tongues which may bite against the edge of a stud over which the button is shoved, it is not necessary to warp the edges of the tongues to bound a helical thread.

This is the construction illustrated in Fig. 12 where D indicates a panel and E a stud having a head engaging the underside of the panel and a smooth shank e extending through an opening in the panel and into the dome of the finishing button. Such shank is readily engaged by the tongues if the button is shoved by straight movement parallel with the axis of the shank into the position shown in Fig. 12, whereupon the tongues would be slightly sprung apart by the shank (which was greater in diameter than the original opening between the tongues) and thus the tongues will have spring biting action on the shank to hold the button in place.

In Figs. 14 to 19, I have shown an octagonal cap nut made in accordance with my invention. These views correspond with Figs. 4 to 9 already described. Briefly, each of the views discloses a hollow cap-like body 40 having an octagonal wall 41 and an octagonal wing 42 provided with oblique and warped tongues 45 made similarly to the tongues 15 heretofore described.

After formation of the cup-like body and the wing as shown in Figs. 14 and 15, the wing is bent over, using its connection 47 with the body as a hinge, into the interior of the body as illustrated in Figs. 16 and 17, and then the edge of the body is flanged over onto the wing 42 which has become the bottom of the cap nut, as indicated at 48. It will be noticed that in this case the connection 47 between the disc and body is substantially the length of one side of the octagon and that the edge portions 46 of the other seven sides are bent over onto the corresponding regions of the wing 42 to form the bottom.

In order to enable the bending in of the various sides to be readily performed, I provide V-shaped notches 49 between the successive extensions 46 on the cap bowl. These notches preferably have their boundaries at such an angle that when the side portions 46 are bent over to make the flanges 48, the ends of each flange region abuts the end of the adjacent flange, as shown in Fig. 19.

By making the cap of polygonal form with straight sides, the flange is accomplished with the maximum of ease. When completed the successive flanges 48 form a nearly complete annulus which forms the extreme lower edge of the cap nut and supports the octagonal wing within the boundary wall with its edges abutting the cap sides.

In Figs. 20, 21 and 22, I have illustrated my invention as applied to a hexagonal nut. In this case I have shown a cap member 50 with six straight sides 51 and a wing 52 carrying two inclined and warped cut out tongues 55. The wing 52 in this case is not shown as hexagonal but as rectangular having a width corresponding to one side of the hexagon and the length corresponding to the distance between two parallel sides of the hexagon.

After the formation, by one or more stamping operations, of the hexagonal hollow body with the extended wing as shown in Fig. 20, the wing is bent over using the joining side 57 as a hinge so that the wing lies within the body with its opposite end abutting the inner face of the opposite side, as indicated by broken lines in Fig. 20. Then the projecting portions of the various sides 51 are flanged inwardly and the particular side directly opposite the hinge located at 58 overlies the wing and locks it in place. All of the flanges about the five sides other than the one carrying the hinge have these inward flanges lying in the same plane and forming the extreme bottom edge of this cap nut. The material of the wall adjacent the junction of the sides is notched so that when each side is flanged inwardly, its end, cut off at a 60° angle, makes a close junction with the adjoining flange.

In Figs. 23 and 24, I have shown my invention adapted to a square nut which is made in a manner similar to the hexagonal nut just above described. In these views, 60 indicates the square body of this cap nut and 62 a tongue extending from one side of the nut and carrying the oblique thread-engaging tongues 65. After the formation of the partially completed article, as shown in Fig. 23, the wing 62 is bent over, on the junction 67 as a hinge, into the position shown in broken lines and then the side walls are flanged inwardly.

The inward flange 68 of the side opposite the hinge locks the wing in place, and the flanges of the other side walls lying in the same plane provide an even bottom edge for the cap nut. On the side where the hinge is located, I prefer to flange inwardly the two portions of the extreme edge of the wall remaining on opposite sides of the hinge. It will be understood that suitable notches are provided in the extreme portions of the wall between the successive sides so that each inward flange is cut off at 45° at the end to make a miter joint with the adjoining flange.

In Figs. 25 and 26, I have illustrated a cap nut in accordance with this invention but each having a different form of thread-engaging means from that heretofore described. Thus in Fig. 25 the hexagonal cap portion 70 carries the integral bottom 72 hinged to it by an integral connection along one of the sides of the cap, this bottom when turned within the cap being held by the flanges of the sides 78 as heretofore described. However, in place of the oblique warped tongues to engage the thread of the bolt, in this case I have provided a continuously warped edge 75 of the bottom about the bolt opening 74, this warped edge presenting nearly one complete turn of a helix and being possible by a lateral offset of the bolt opening 74 to allow the edge on one side to be lifted above that on the other.

In Fig. 26, the hexagonal nut 80 has a wall 81 provided with the integral bottom 82 turned inwardly on the connection 87 with the wall as a hinge. The bottom has a perimeter corresponding to the interior of the cap and contacts at its edge with the inner surface of the cap wall and is held in place by an inward flange 88 of the wall, as heretofore described. However, in this case, I have shown the thread-engaging portion of the base as a sleeve 85 drawn from the material of the base about the bolt opening 84, such sleeve being internally tapped to provide a plurality of threads to engage the bolt. This form of cap nut is quite useful where there is an unusually heavy tensile stress on the bolt.

In Figs. 27 and 28, I have illustrated cap nuts made in accordance with my invention suitable for utilization as finishing members for attachment to the projecting portions of bolts already held by nuts. Thus in Fig. 27 the hexagonal nut 90 has its base 92 extended inwardly in the form of an inverted dish to provide space for an ordinary fastening nut F which may lie beneath it. This view shows a bolt G extending through a support H and held by the nut F with a projecting portion $g$ of the bolt, and my nut 90 may be mounted as a finishing button with the lower edge of the cap nut engaging the support H and the tongues 95 of the cap nut coacting with the thread of the projecting portion $g$ of the bolt. It is to be understood that this form of nut is made by the same general method as heretofore described, being stamped with the open bowl and the extending bottom, which is thereafter bent inwardly on the connection 97 at one side as a hinge, the bottom being held in place by the inward flanging 98 of the cap.

In Fig. 28, I have shown my cap nut 100 as a finishing cap on the projecting portion of a bolt which is held by a sheet metal nut which underlies the cap. In this view, J indicates the bolt, the threaded shank $j$ of which extends through a support K and is locked by a sheet metal nut L, which has oblique spring tongues $l$ engaging the thread of the bolt shank. My cap nut is of the general form heretofore described, and as illustrated is substantially the same nut as shown in Fig. 22. It has the integral bottom 102 with the raised spring tongues 105, the bottom being held in place by the inwardly bent flanges 108 of the wall of the nut.

In Fig. 29, I have illustrated substantially the same nut as shown in Fig. 28 but used not as a finishing member but as the retaining member on a bolt holding two plates together. Here the bolt M has a shank $m$ passing through two plates P and Q to be secured together, and the nut 110 has the integral bottom 112 carrying the spring tongues 115 engaging the thread of the shank $m$. The side wall of the nut, as heretofore described, is flanged inwardly as shown at 118 beneath the bottom which integrally joins the wall of the cap at 117. When the cap is screwed home the bottom flange 118 engages the plate P, and the two plates are tightly clamped between the nut and the bolt head.

In Figs. 30, 31 and 32, I have illustrated my invention as applied to the manufacture of a cap nut of conical form. Fig. 30 illustrates the original cut out flat blank of sheet metal, which has a sector portion 120 and a disc portion 122 integrally connected for a short distance at 127. The disc portion which is to form the bottom has a pair of tongues 125 on opposite sides of the bolt opening 124. These tongues after being cut free at their opposite sides and adjacent ends raised are warped as heretofore described.

The flat sector shaped portion 120 of the blank in Fig. 30 is now curled to bring the extreme edges 121 into abutting relation, thus producing a cone, such edges being soldered or welded together if desired. Then the disc to form the bottom is bent inwardly on the connection 127 as a hinge into a position normal to the axis of the cone and lying within the cone with the perimeter of the bottom engaging the conical surface. Then the extreme bottom edge of the cone is flanged inwardly, as shown at 128, to produce the complete device shown in Figs. 31 and 32.

It will be seen from the various embodiments of the invention illustrated in the different views that my invention has a wide extent of adaptation. Notwithstanding the difference in the specific forms shown they are all characterized by a cap device being made of a single piece of sheet material, deformed to produce the body of the device and the extended base, the base being thereafter bent in on its connection with the body as a hinge into the body slightly beyond its free edge, and such free edge being thereafter flanged inwardly to lock the base in place. These operations of stamping, bending and flanging are well known and readily performed, so that my cap device may be produced by this method with great rapidity and at comparatively small expense.

I claim:

1. A cap device made of sheet material comprising a hollow body, a base integrally united with the body for a short distance at one edge and lying within the body, the body being flanged inwardly beneath the base, the base having an opening for the passage of a stud, bolt or screw.

2. A cap device made of a single piece of sheet metal comprising a hollow body, a base integrally united with the wall of the body for a short distance spaced slightly from the edge of the body, said base lying within the body, the body being flanged inwardly beneath the base, the base having an opening for the passage of a stud, bolt or screw, the material of the base about the opening being distorted to provide means extending within the cap to engage a stud, screw or bolt.

3. A cap made of a single piece of sheet metal comprising a hollow body, a base joined to the body at one edge of the base for a short distance, said base standing within the end portion of the body and having a central opening, the material of the base being distorted to project inwardly of the cap about the opening and formed with a helical edge to engage a screw or bolt passing through the opening, the extreme edge of the body being flanged inwardly across the edge of the base 4. A cap device made of a single piece of sheet metal formed with a hollow body having a top and a wall, said wall being notched for a short distance, a base within the body joined to the wall at the notch, the base having a central opening, a pair of opposed tongues formed on the base on opposite sides of the opening and extending into the hollow of the body, the extreme edge of the body being flanged inwardly across the base.

5. A screw cap made of a single piece of sheet material comprising a bowl portion with a closed top and a round wall and a disc-like bottom portion united to the wall for a short distance, said bottom being substantially a circular disc with its periphery, except at the junction, engaging the inner surface of the wall and the wall being flanged inwardly across the bottom, the bottom having an opening through it centrally located and having a pair of tongues cut from the material of the bottom and bent and warped at their edges whereby they may engage a screw thread.

6. A hollow cap nut of a single piece of sheet material comprising a body having a polygonal wall, a base united to the body at one flat face of the wall adjacent the free edge but extending across the body within it, the base having an opening for the passage of a retaining member and the edge of the wall, opposite the hinge, being flanged inwardly across the base.

7. A cap nut made of sheet metal having a closed top and a polygonal wall, a polygonal bottom lying within the hollow of the cap portion and joined to it at one wall and engaging the inner surface of the polygonal wall, the base being formed with a central opening and distortions of the material about the opening to provide engaging portions for a helical thread, and the sides of the polygonal wall being bent inwardly at their edges across the various edges of the base other than its integral junction with the body.

8. A cap nut having a polygonal wall suitable for the application of a wrench, a rectangular base member integrally united to one of the sides of the wall and extending across the hollow of the cap into abutting relation with the opposite wall, said opposite wall being flanged inwardly across the extreme end of the rectangular base, said base being formed with an opening, the metal of the base being distorted about the opening to provide a helical turn to engage a screw thread.

9. A cap device made of a single piece of sheet material comprising a hollow body with a continuous wall, a single base member integrally united with the wall of the body only at one side of the latter and extending crosswise of the body beyond its axis and having an opening for the passage of a stud and the material of the base surrounding the opening and being deformed to provide means extending within the cap device to engage the stud passing through the opening.

10. A cap device made of a single piece of sheet material comprising a hollow symmetrical body, a base integrally united with a wall of the body only for a short distance at one side thereof and extending therefrom crosswise of the body and beyond the center thereof, there being a centrally located opening through the inturned base member, and a pair of tongues made of such member on respectively opposite sides of the opening, the ends of said tongues being spaced apart and adapted to engage a stud passing through the opening.

11. A cap made of a single piece of sheet material comprising a bowl portion having a closed top and a round wall and a bottom portion united to the wall only for a short distance at one side thereof, such bottom portion being bent from the wall to extend inwardly in a direction substantially normal to the axis of the cap, said bottom portion extending beyond the axis and having an opening at such axis and deformed about the opening to provide holding means adapted to engage opposite sides of a stud passing through the opening into the cap.

12. A hollow cap nut of a single piece of sheet material comprising a body having a continuous polygonal wall, a base united to the body only at one flat face of the wall adjacent the free edge but extending across the body within it and beyond the axis thereof, the base having an opening for the passage of a retaining member and thread engaging means carried by the inturned base about the opening therethrough.

13. A screw cap made of a single piece of sheet material comprising a bowl portion having a closed top and a continuous polygonal wall and a bottom portion united only to one flat face of the wall adjacent its free edge, such bottom portion being bent from the wall to extend inwardly in a direction substantially normal to the axis of the cap and continuing beyond such axis, said bottom portion having an opening at such axis for a screw passing through the opening and having a pair of tongues cut from the material of said bottom portion and bent at an acute angle thereto projecting into the cap and adapted to engage opposite regions of said screw.

GEORGE A. TINNERMAN.